United States Patent [19]
Lee

[11] Patent Number: 5,924,765
[45] Date of Patent: Jul. 20, 1999

[54] SHOCK ABSORBER FOR SIDE SILLS OF CHASSIS

[75] Inventor: Ju-Yong Lee, Kyunggi-do, Rep. of Korea

[73] Assignee: Hyundai Motor Company, Seoul, Rep. of Korea

[21] Appl. No.: 08/942,345

[22] Filed: Oct. 1, 1997

Related U.S. Application Data

[30] Foreign Application Priority Data

Oct. 1, 1996 [KR] Rep. of Korea ................ 96-43391

[51] Int. Cl.$^6$ .................................................. B62D 21/04
[52] U.S. Cl. ........................... 296/209; 267/116; 296/189
[58] Field of Search ................................ 188/268, 282.8, 188/377; 267/139, 116, 158, 136, 163; 296/185, 187, 188, 189, 192, 203, 209

[56] References Cited

U.S. PATENT DOCUMENTS

| | | | |
|---|---|---|---|
| 3,779,595 | 12/1973 | Suzuki et al. | ............................ 296/189 |
| 4,096,927 | 6/1978 | Takatsu | ................................... 267/116 |
| 4,582,357 | 4/1986 | Nakamura et al. | ..................... 296/209 |

*Primary Examiner*—Matthew C. Graham
*Assistant Examiner*—Mariano Sy
*Attorney, Agent, or Firm*—Christie, Parker & Hale, LLP

[57] ABSTRACT

A shock absorber for side sills of a chassis is disclosed. The shock absorber is installed in each side sill of a chassis and effectively absorbs a side impact at the side sill in the event of a side collision of a car, thus effectively reducing impact transmission velocity and preventing the side sill from being badly thrust into the passenger compartment in such a collision. In the shock absorber, a fixed guide pipe penetrates the center of a reinforcing member of a side sill box with both ends of the pipe being projected into inner and outer panels of the side sill box. A retractable damper is movably inserted into the guide pipe at a position inside the outer panel, thus primarily absorbing the side impact. A support member is elastically and movably inserted into the guide pipe at a position inside the inner panel, thus finally absorbing the impact.

1 Claim, 2 Drawing Sheets

SHOCK ABSORBER FOR SIDE SILLS OF CHASSIS

BACKGROUND OF THE INVENTION

1. Field of the Invention

The present invention relates, in general, to side sills of a chassis and, more particularly, to a shock absorber for such side sills capable of effectively reducing impact transmission velocity at a side sill and preventing the side sill from being badly thrust into the passenger compartment in the event of a side collision, thus protecting passengers from serious injury and improving the safety of automobiles.

2. Description of the Prior Art

As well known to those skilled in the art, in order to secure the safety of passengers in the event of a car collision, it is necessary to perform collision tests of randomly selected sample cars in automobile manufacturing companies. Typically, two collision tests, that is, a head-on collision test and a side collision test, are performed to accomplish such an object. Such collision tests determine whether the cars meet collision safety standards, which are specified in the law. Most countries restrict imports of automobiles having collision safety values, which do not meet the specified safety standards.

In accordance with such collision tests, known automobiles are designed to somewhat effectively protect passengers from a head-on collision. However, the automobiles regrettably fail to effectively protect passengers from a side collision.

Such a failure in protecting passengers from a side collision is caused by a structural limit of a chassis. That is, the known side sill of a chassis is too frail to effectively resist being thrust into the passenger compartment in the event of a side collision of a car, thus causing the center pillar, side doors and roof to be badly dented into the passenger compartment and seriously injuring passengers in such a side collision. Therefore, the known side sill of a chassis reduces the safety of a car.

FIG. 1 is a perspective view of a chassis with a side sill being typically positioned at each side of the chassis. FIG. 2 is a sectional view showing the construction of a known side sill. As shown in the drawings, the known side sill is comprised of a side sill box 5, which is mounted at each side of a chassis at a position outside a center floor panel 1. In order to form such a side sill box 5, a side sill inner panel 2 is integrated with a side sill outer panel 3 into a hollow single structure, with a reinforcing member 4 being interiorly fixed to the outer panel 3 at its top and bottom ends so as to reinforce the hollow box 5.

However, the known side sill has a frail support, thus failing to effectively absorb a side impact at its outside portion in the event of a side collision. Therefore, the side sill allows the panels 1, 2, 3 and the reinforcing member 4 to be thrust into the passenger compartment in the event of such a collision. Therefore, the center pillar, side doors and roof of the car are badly dented into the passenger compartment and seriously injure the passengers in the passenger compartment. Such a frail side sill of the chassis reduces the safety of a car.

SUMMARY OF THE INVENTION

Accordingly, the present invention has been made keeping in mind the above problems occurring in the prior art, and an object of the present invention is to provide a shock absorber for side sills of a chassis, which is provided in each side sill of the chassis and effectively absorbs a side impact at the side sill in the event of a side collision, thus reducing impact transmission velocity at the side sill and preventing the side sill from being badly thrust into the passenger compartment in such a collision and protecting passengers from serious injury, and improving the safety of automobiles.

In order to accomplish the above object, the present invention provides a shock absorber for a side sill of a chassis, the side sill being comprised of a side sill inner panel integrated with an outer panel into a hollow side sill box with a reinforcing member being interiorly fixed to the outer panel at its top and bottom ends so as to reinforce the hollow box, comprising: a fixed guide pipe penetrating the center of the reinforcing member with both ends of the pipe being projected into the inner and outer panels; a retractable damper movably inserted into the guide pipe at a position inside the outer panel; and a support member made of a spring steel into a single structure and bent at its center, thus forming a rounded nose at the center with two elastic legs extending from both ends of the nose, the support member being elastically and movably inserted into the guide pipe at a position inside the inner panel, with both the nose coming into contact with the damper and the two legs being normally spaced apart from the inside wall of the inner panel, the legs selectively coming into movable contact with the inside wall of the inner panel in the event of a side collision of a car.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
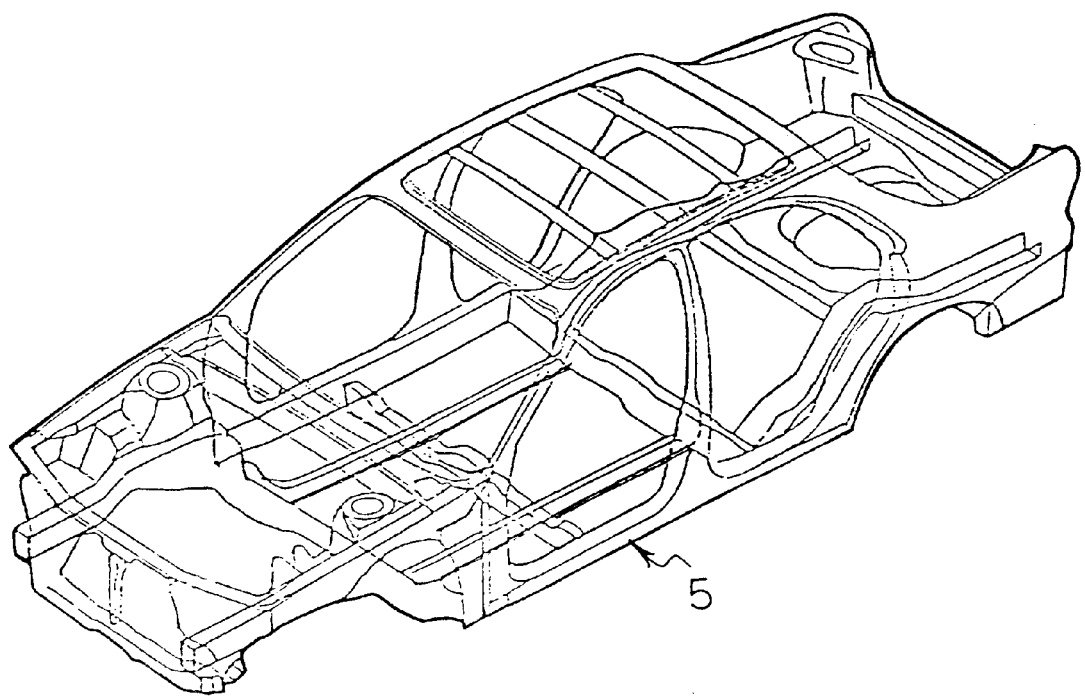
FIG. 1 is a perspective view of a chassis with a side sill being typically positioned at each side of the chassis.
Figure 2:
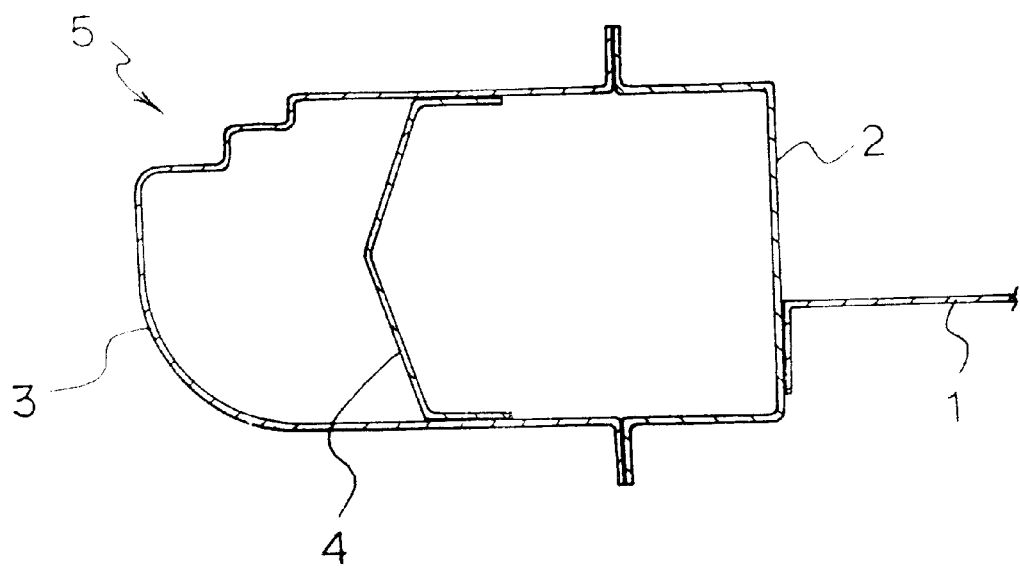
FIG. 2 is a sectional view showing the construction of a known side sill.
Figure 3:
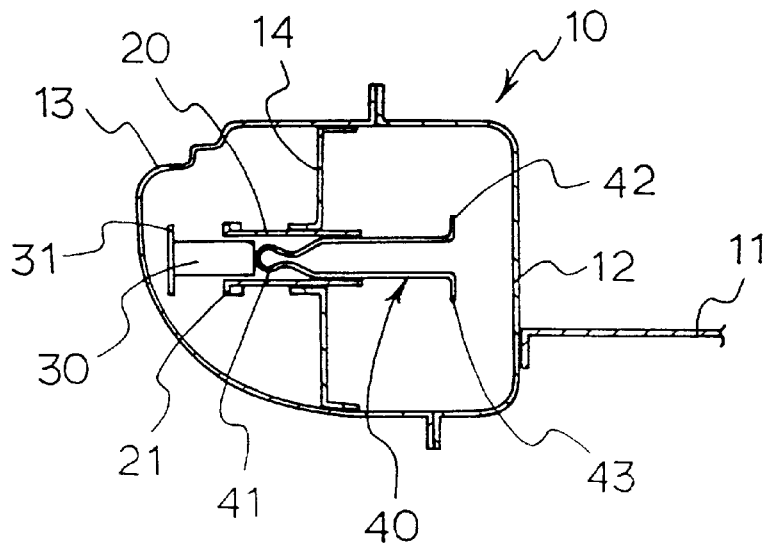
FIG. 3 is a sectional view showing the construction of a side sill having a shock absorber in accordance with the preferred embodiment of the present invention.
Figure 4:
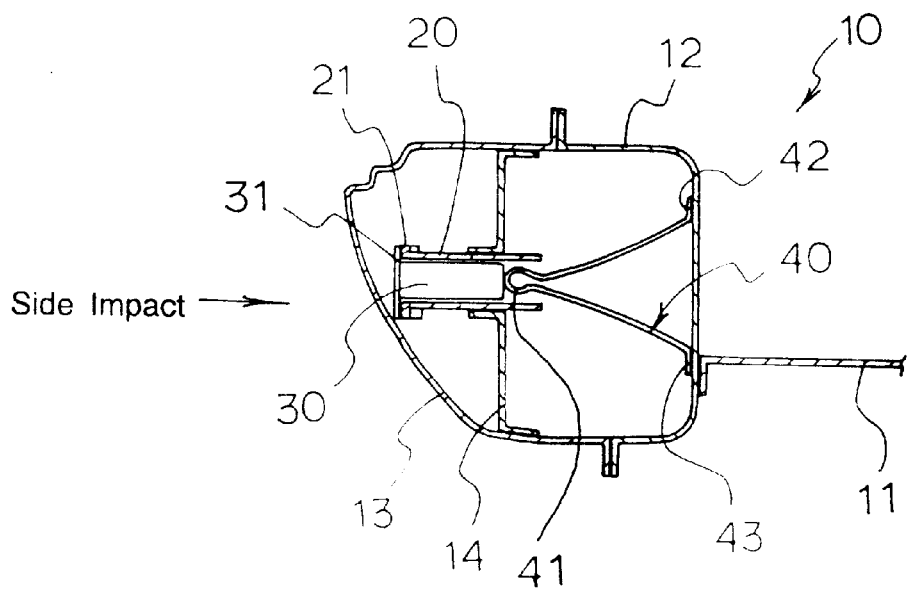
FIG. 4 is a sectional view showing the operational effect the shock absorber of this invention in the event of a side collision.

FIG. 3 is a sectional view showing the construction of a side sill having a shock absorber in accordance with the preferred embodiment of this present invention. FIG. 4 is a sectional view showing the operational effect the shock absorber of this invention in the event of a side collision. As shown in the drawings, the side sill of this invention is comprised of a side sill box 10, which is mounted at each side of a chassis at a position outside a center floor panel 11. In the side sill box 10 a side sill inner panel 12 is integrated with a side sill outer panel 13 into a hollow single structure, with a reinforcing member 14 being interiorly fixed to the outer panel 13 at its top and bottom ends so as to reinforce the hollow box 10 in the same manner as described for the known side sill of FIG. 2. However, the side sill of this invention is provided with a shock absorber for effectively absorbing a side impact at the side sill in the event of a side collision. The shock absorber is comprised of a fixed guide pipe 20, which penetrates the center of the reinforcing member 14 with both ends of the pipe 20 being projected into the inner and outer panels 12 and 13 respectively. Movably inserted into the guide pipe 20 at a position inside the outer panel 13 is a retractable damper 30, with the impact acting end of the damper 30 being projected into the outer panel 13. The damper 30 is used for primarily absorbing a side impact at the initial stage of a side collision. A support member 40, which is used for finally absorbing the side impact, is elastically and movably inserted into the guide pipe 20 at a position inside the outer panel 13. The support member 40 is preferably made of a spring steel and is formed into a specific cross-section with a rounded nose 41 being formed at the center of the member 40 and two elastic legs 42 and 43 extending from both ends of the nose 41. The support member 40 is inserted into the guide pipe 20, with both the nose 41 always coming into contact with the inside end of the damper 30 and the two legs 42 and 43 being normally spaced apart from the inside wall of the inner panel 12. When a side impact is applied to the damper 30 in the event of a side collision, the damper 30 is pushed into the guide pipe 20 while primarily absorbing the impact. In such a case, the support member 40 is pushed into the inner panel 12 by the damper 30 and so the two legs 42 and 43 of the member 40 are brought into contact with and elastically move on the inside wall of the inner panel 12 while getting wider and finally absorbing the impact.

The hollow guide pipe 20 is provided with a stop protrusion 21, which is exteriorly mounted onto the outside end of the pipe 20.

The damper 30, which is used for primarily absorbing a side impact at the initial stage of a side collision, is provided with a stop flange 31 at the impact acting surface thereof. The stop flange 31 selectively comes into contact with and is stopped by the stop protrusion 21 of the pipe 20 when a side impact is applied to the damper 30.

The support member 40, which is used for finally absorbing the side impact, is formed by bending the center of a plate spring into an arc-shaped nose 41 with two legs 42 and 43 and is elastically and movably inserted into the guide pipe 20 with the nose 41 always coming into contact with the inside end of the damper 30 as shown in FIG. 3. The free end of each leg 42, 43 of the member 40 is externally bent, thus forming a foot at which each leg 42, 43 is brought into contact with and elastically moves on the inside wall of the inner panel 12 while finally absorbing a side impact in the event of a side collision.

The operational effect of the above shock absorber will be described hereinbelow.

In the event of a side collision of a car, a side impact is exteriorly applied to the outer panel 13 and so the panel 13 is dented inwardly and comes into contact with the damper 30, thus allowing the damper 30 to primarily absorb the impact as shown in FIG. 4.

When the side impact is further applied to the damper 30, the damper 30 is pushed inwardly, thus thrusting the support member 40 into the inner panel 12. Therefore, the two legs 42 and 43 of the member 40 are brought into contact with and elastically move on the inside wall of the inner panel 12 while getting wider and finally absorbing the impact.

In a brief description, in the event of a side collision of a car, the shock absorber of this invention primarily absorbs a side impact by the damper 30 and finally absorbs the impact by the support member 40 made of a spring steel, thus effectively reducing impact transmission velocity.

As described above, the present invention provides a shock absorber for the side sills of a chassis. The shock absorber is provided in each side sill of a chassis and effectively absorbs a side impact at the side sill in the event of a side collision, thus reducing impact transmission velocity and preventing the side sill from being badly thrust into the passenger compartment in such a collision. The shock absorber thus effectively protects passengers from serious injury in the event of a side collision and improves the safety of automobiles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A shock absorber for a side sill of a chassis, the side sill being comprised of a side sill inner panel integrated with an outer panel into a hollow side sill box with a reinforcing member being interiorly fixed to the outer panel at its top and bottom ends so as to reinforce the hollow box, comprising:

a fixed guide pipe penetrating the center of said reinforcing member with both ends of the pipe being projected into the inner and outer panels;

a retractable damper movably inserted into said guide pipe at a position inside the outer panel; and a support member made of a spring steel into a single structure and bent at its center, thus forming a rounded nose at the center with two elastic legs extending from both ends of said nose, said support member being elastically and movably inserted into the guide pipe at a position inside the inner panel, with both the nose coming into contact with the damper and the two legs being normally spaced apart from the inside wall of said inner panel, said legs selectively coming into movable contact with the inside wall of the inner panel in the event of a side collision of a chassis.

* * * * *